Feb. 28, 1967 D. VOGLER ETAL 3,306,545

APPARATUS FOR ATTACHING A TAPE TO A REEL

Filed July 8, 1963 5 Sheets-Sheet 1

Inventors:
Wilhelm Felsichausen
and Dieter Vogler
by Michael S. Striker
Attorney Feb. 28, 1967 D. VOGLER ETAL 3,306,545

APPARATUS FOR ATTACHING A TAPE TO A REEL

Filed July 8, 1963 5 Sheets-Sheet 2

Inventors:
Wilhelm Felstehausen
and Dieter Vogler
by Michael S. Striker
Attorney

APPARATUS FOR ATTACHING A TAPE TO A REEL

Filed July 8, 1963 5 Sheets-Sheet 3

Inventors:
Wilhelm Felstehausen
and Dieter Vogler
by Michael S. Striker
Attorney

APPARATUS FOR ATTACHING A TAPE TO A REEL

Filed July 8, 1963 5 Sheets-Sheet 4

INVENTORS
Wilhelm Felstehausen
and Dieter Vogler
BY
Michael S. Striker
Attorney

Inventors:
Wilhelm Felstehausen
and Dieter Vogler
by: Michael S. Striker
Attorney

United States Patent Office 3,306,545
Patented Feb. 28, 1967

3,306,545

APPARATUS FOR ATTACHING A TAPE TO A REEL

Dieter Vogler, Stuttgart, and Wilhelm Felstehausen, Nurnberg, Germany, assignors to Max Grundig, Furth, Bavaria, Germany Filed July 8, 1963, Ser. No. 295,869
Claims priority, application Germany, Aug. 19, 1961, G 32,964; July 7, 1962, G 35,409
9 Claims. (Cl. 242—55.13)

This application is a continuation-in-part of copending application Serial No. 220,934, filed August 20, 1962, now abandoned.

The present invention relates to apparatus which works with tape, such as a sound recorder which uses magnetic tape.

With structures of this type it is, of course, necessary to attach one end of a tape to a reel onto which the tape is wound during use of the apparatus. Considerable difficulties are encountered in attaching an end of a tape to a reel. Thus, where the operator manually attaches a free end of a tape to a reel a considerable amount of manual dexterity is required, and proposals have already been made to automatically attach an end of a tape to a reel, but the structures presently known for this purpose are not satisfactory. For example, there are certain structures where an elongated tape portion is permanently connected with a reel and it is necessary to connect the end of a tape to the free end of such an elongated tape portion, structure being provided for joining togther the free end of the tape and the free end of the tape portion which extends permanently from the reel. In the first place these structures do not operate reliably, and in the second place a considerable amount of inconvenience is involved in the permanent presence of a tape portion extending from the reel. Often as not this tape portion itself is completely wound onto the reel, so that in order to place the apparatus in a condition ready to have a tape attached thereto it is necessary for the operator to unwind the tape portion which is permanently attached to the reel, and this in itself involves a considerable amount of inconvenience.

It is accordingly a primary object of the present invention to provide a structure which will avoid the above drawbacks and which will reliably attach a tape to a reel without requiring anything like tape portions permanently connected to the reel.

It is furthermore an object of the present invention to provide a structure which will automatically attach a tape to a reel in response to placing of the tape on the machine.

It is furthermore an object of the present invention to provide a structure which will very quickly attach a tape to a reel, even driving the machine at a faster rate until after the tape has been attached and at least partially wound onto the reel, and then controlling the machine so that it will continue to operate at its normal speed.

It is also an object of the present invention to provide a structure which will guarantee that the tape remains on the machine until after the tape has been disconnected from the reel to which it has previously been attached.

With the above objects in view, the invention includes, in a tape-handling apparatus, a tape having an elongated leader portion to which a fitting is connected, and a rotary reel means to which the tape is to be attached. In accordance with the present invention when the tape is mounted on the machine a lever means is actuated, in response to mounting of the tape on the machine, for engaging the fitting at the leading end of the tape and for transporting this fitting to the rotary reel means to which the fitting becomes automatically attached, so that in this way the structure of the invention operates in a fully automatic manner to attach a tape to a reel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
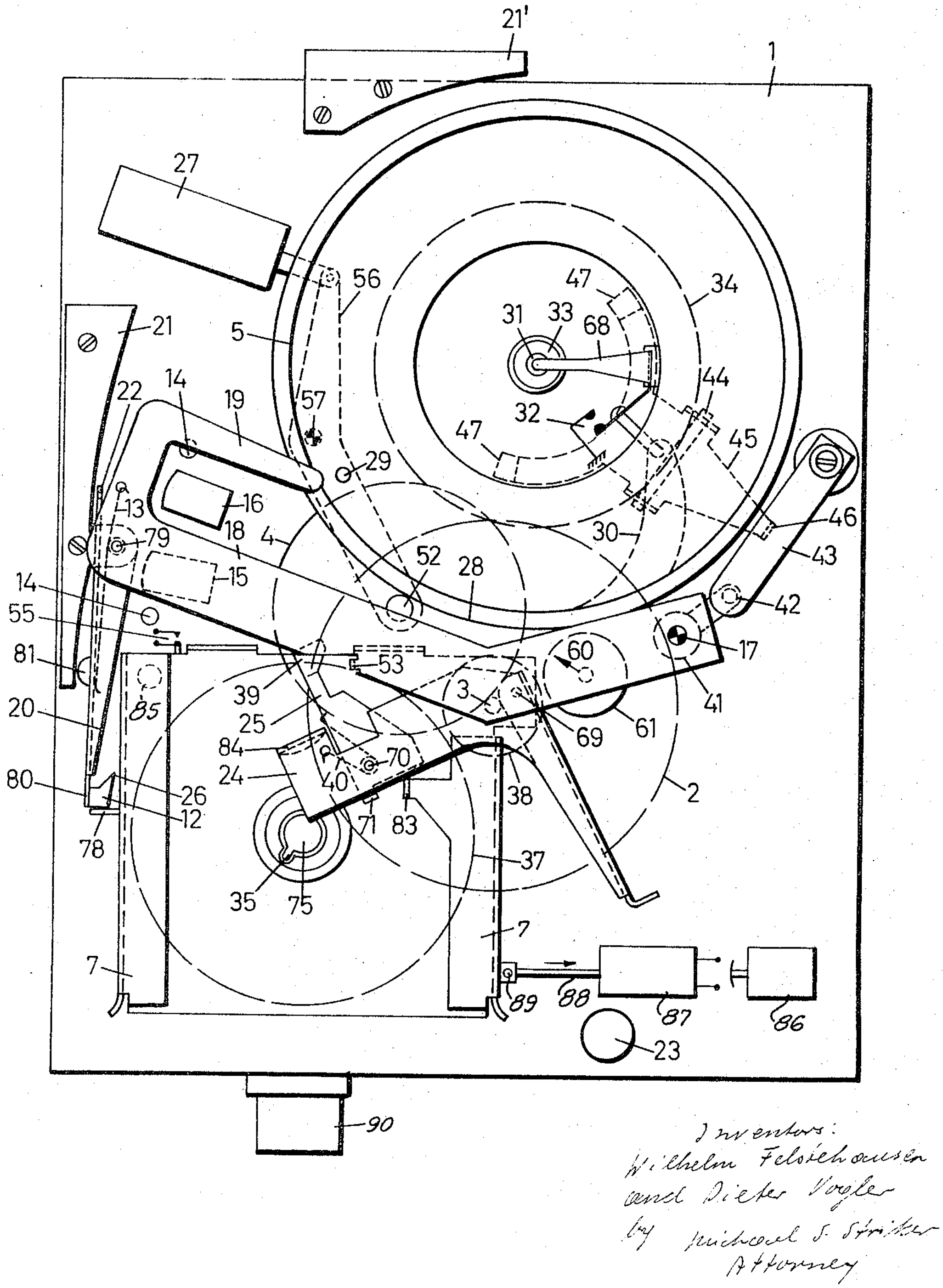
FIG. 1 is a partly schematic top plan view of one possible structure according to the present invention.

Referring to FIGS. 1–4, it will be seen that the supporting structure includes a stationary plate 1 on which the various elements of the structure of the invention are mounted. Thus, it will be seen that there is suitably mounted over the plate 1 a support means 7 for the tape 8 (FIG. 2), this support means 7 being in the form of a frame which receives the cassette 6 in which the tape 8 is housed. This frame 7 has a bottom wall parallel to and located over the wall 1 and joined at its opposite side edges to a pair of upwardly directed wall portions which are in turn joined to upper wall portions which extend inwardly toward each other and overlie the bottom wall portion of the frame 7, so that in this way the frame 7 is in the form of a bottom plate having at its side edges a pair of channels for receiving the side edges of the cassette 6, the latter being introduced through the front end of the frame 7 to be displaced along the latter rearwardly until the cassette 6 reaches a position indicated in FIG. 2. Within the cassette 6 is located a rotary core member 9 whose central portion is exposed, and the inner end of the tape 8 is joined to the rotary core member 9 in any suitable way, this core member 9 being made of plastic which may be die-cast, for example. If desired the inner end of the tape 8 may simply be removably attached to the core 9. The outer end of the tape 8 is permanently connected with an elongated leader portion 10 which is mechanically stiffer than the remainder of the flexible tape 8. The leader band portion 10 is preferably made of a transparent, elastic plastic material of a relatively high tensile strength. The free end of the leader portion 10 carries a fitting 11 which is permanently fixed to the leading end of the leader portion 10, and this tubular fitting 11 extends across the tape portion 10 and has free ends respectively located laterally beyond the opposed side edges of the tape portion 10, although the extent to which the fitting 11 extends beyond the side edges of the leader portion 10 is relatively small. The leader portion 10 has the fitting 11 thereof formed with an opening for receiving the pointed tip 26 of a catch member 12 which is formed as part of a lever 20 which is pivotally connected at 79 to a lever 18 for a purpose described below. The dimensions of the cassette 6 exceed the dimensions of the entire spool of tape 8 by a relatively small amount, and at its upper left corner, as viewed in FIG. 2, the cassette is formed with a notch which receives the fitting 11 in the manner shown in FIG. 2, when the tape 8 is completely wound into the cassette 6, this cassette 6 being, for example, of rectangular or square configuration.

Figure 2:
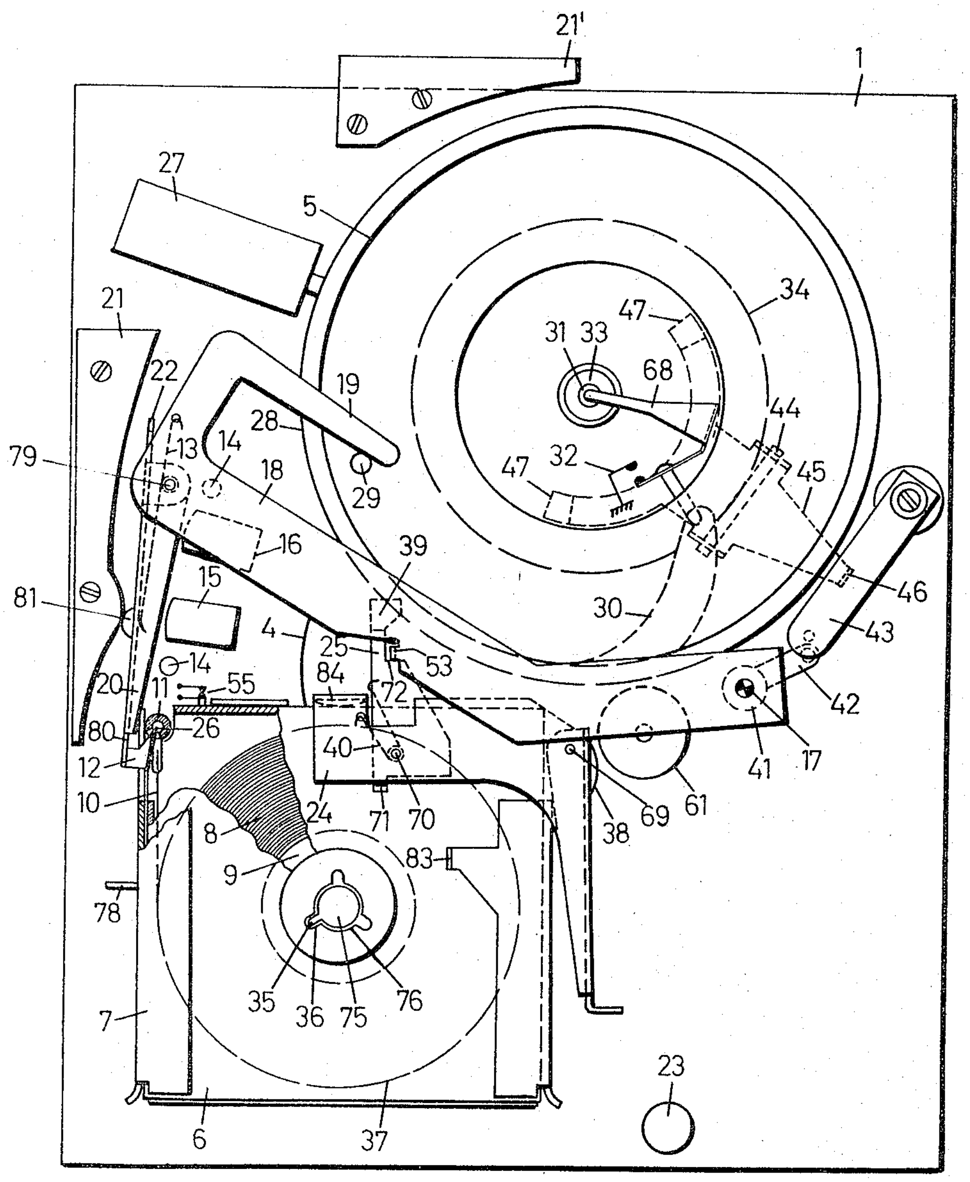
FIG. 2 shows the structure of FIG. 1 after a tape has been mounted on the machine but before the leading end of the tape has been attached to the reel.

As is apparent particularly from FIG. 2, a guide pin 14 is situated adjacent that corner of the cassette 6 where the fitting 11 is located, when the cassette 6 has been mounted in the frame or support means 7, and this pin 14 is followed by an erase head 15, preferably made of a permanent magnet, the erase head 15 being followed by a recording and play-back head 16, and this latter unit is followed by another guide pin 14.

The structure of the invention will automatically connect the leading end of the tape to the rotary reel means 5, described below, and the structure for connecting the tape to the reel means 5 includes a lever means made up in part by an elongated swing-lever 18 supported for turning movement by a stationary pivot pin 17, which is of course carried by the plate 1. At its left free end, as viewed in FIGS. 1 and 2, the lever 18 has a substantially C-shaped end portion terminating in the elongated guiding part 19, and it will be noted that the pivot 79 which connects the lever 20 to the lever 18 is located at this left free end portion of the lever 18. A spring 13 is coiled in part about the pivot 79, has one end connected to the lever 18 by passing through an opening thereof, and has an opposite end pressing against the lever 20 for urging the latter to turn in a clockwise direction, relative to the lever 18, as viewed in FIGS. 1–3. This turning of the lever 20 by the spring 13 is limited either by engagement of a lug 22 of the lever 20 with the left end of the lever 18, as viewed in FIGS. 1 and 2, or by engagement of a projection 81 of the lever 20 with the surface of a guide means 21, 21′, this guide means being made up of separate elements 21 and 21′ which are carried by the plate 1. The cooperation of the guide 21 with the projection 81 of the lever 20 guarantees that the fitting 11 will clear the elements 14–16 during movement of the fitting 11 toward the reel 5, in a manner described below.

The rotary reel means 5 is driven by a drive means which is adjustable so that in one position thereof it will drive the reel means at a normal speed and at another position thereof it will drive the reel means at a faster than normal speed. This drive means includes an electric motor 2 carried by the plate 1 (FIG. 4) and having an output shaft 3. As is shown most clearly in FIG. 5, the reel 5 has an elongated hollow hub 54 about which a friction wheel 28 is freely rotatable, this friction wheel 28 driving the reel 5 through the slip clutch 58. The drive from the shaft 3 of the motor 2 to the friction wheel 28 is transmitted through a friction wheel 4, which is adapted to be placed in engagement with the shaft 3 in a manner described below, and a friction wheel 52 permanently connected coaxially with the wheel 4 and frictionally pressing against the wheel 28 when the wheel 4 engages the drive shaft 3, and in this position of the drive means the reel 5 will be driven at a normal speed. In order to drive the reel 5 at a faster than normal speed, a friction wheel 38, which is fixed coaxially with the motor shaft 3, transmits the drive from the motor through a friction wheel 61 to the friction wheel 28 of the reel 5, and a solenoid 60 shown in FIG. 6 and diagrammatically indicated in FIG. 1 is operatively connected to the friction wheel 61 for shifting the latter to an operative position engaging the wheels 28 and 38 in order to provide the fast drive of the reel 5. During normal operation the reel 5 is driven through the slip clutch 58 and the friction wheel 28, and this structure provides the slippage necessary to compensate for the increase in the diameter of the wound tape while maintaining a constant speed of movement of the tape to the reel, this latter constant speed of the tape being provided in a known way through unillustrated rollers which engage and transport the tape at a constant speed toward the reel 5.

During movement of the leading end of the leader portion 10 to the reel 5, the above-described normal speed of drive is provided for the reel 5. However, once the fitting 11 reaches the reel 5, the slip clutch structure is rendered inoperative and instead a direct drive to the reel 5 is provided while at the same time the drive means is placed in the position providing the fast speed for the reel 5. The friction of the slip clutch is insufficient to provide reliable pulling of the leader portion of the tape onto the reel 5, and for this reason the substantially direct drive, eliminating the drive through the friction clutch, is provided. In order to provide such a substantially direct drive, the plate 1 carries a lever 45 supported for turning movement by a horizontal pivot pin 44 carried by the plate 1 in the manner shown most clearly in FIG. 5. The outline of the lever 45 is clearly shown in FIGS. 1–3. The lever 45 has a pair of arms 47 extending along a circle whose center coincides with the reel 5, and these arms 47 extend beneath a ring 48 which is freely turnable with respect to and axially movable along the tubular hub 54 of the reel 5. The ring 48 has an upper, annular toothed portion which has upwardly directed teeth which are adapted to mesh with the downwardly directed teeth of a ring 49 which is carried by the rotary friction wheel 28 which is free to turn with respect to the hub 54 and which drives the reel 5 through the friction clutch 58, as described above.

It will be noted that a coil spring 66 surrounds the tubular hub 54 and is located against the lower ring 48. When the lever 45 is turned in a counterclockwise direction, as viewed in FIG. 5, it will raise the ring 48 toward the ring 49, and the teeth of these rings will mesh with each other so that the rings 48 and 49 will become connected together. The upper end of the spring 66 engages an intermediate ring 67 which is freely movable with respect to the tubular hub 54, and this ring 67 is connected to leaf spring members 51 the upper ends of which are in engagement with a disc 50 located beneath the friction clutch 58. Therefore, in response to upward movement of the ring 48, when the lever 45 is turned in a counterclockwise direction, as viewed in FIG. 5, the springs 66 and 51 will compress the friction clutch elements 58 so that in this way the friction wheel 28 has with respect to the reel 5 the equivalent of a rigid connection thereto, and in this way the downward turning of the outer end 46 of the lever 45 will result in elimination of the friction clutch operation and in the provision of a direct connection between the friction wheel 28 and the reel 5.

In order to start the machine, the operator will depress the switch-button 23 located at the front of the plate 1, and this will, in an unillustrated manner, close a circuit in which the motor 2 is located, so that in this way the motor 2 will start to operate.

The operator will then introduce the cassette 6 into the frame 7, in the manner described above, shifting the cassette 6 rearwardly until it reaches the position indicated in FIG. 2 where it has been fully introduced into the frame or support means 7.

Figure 3:
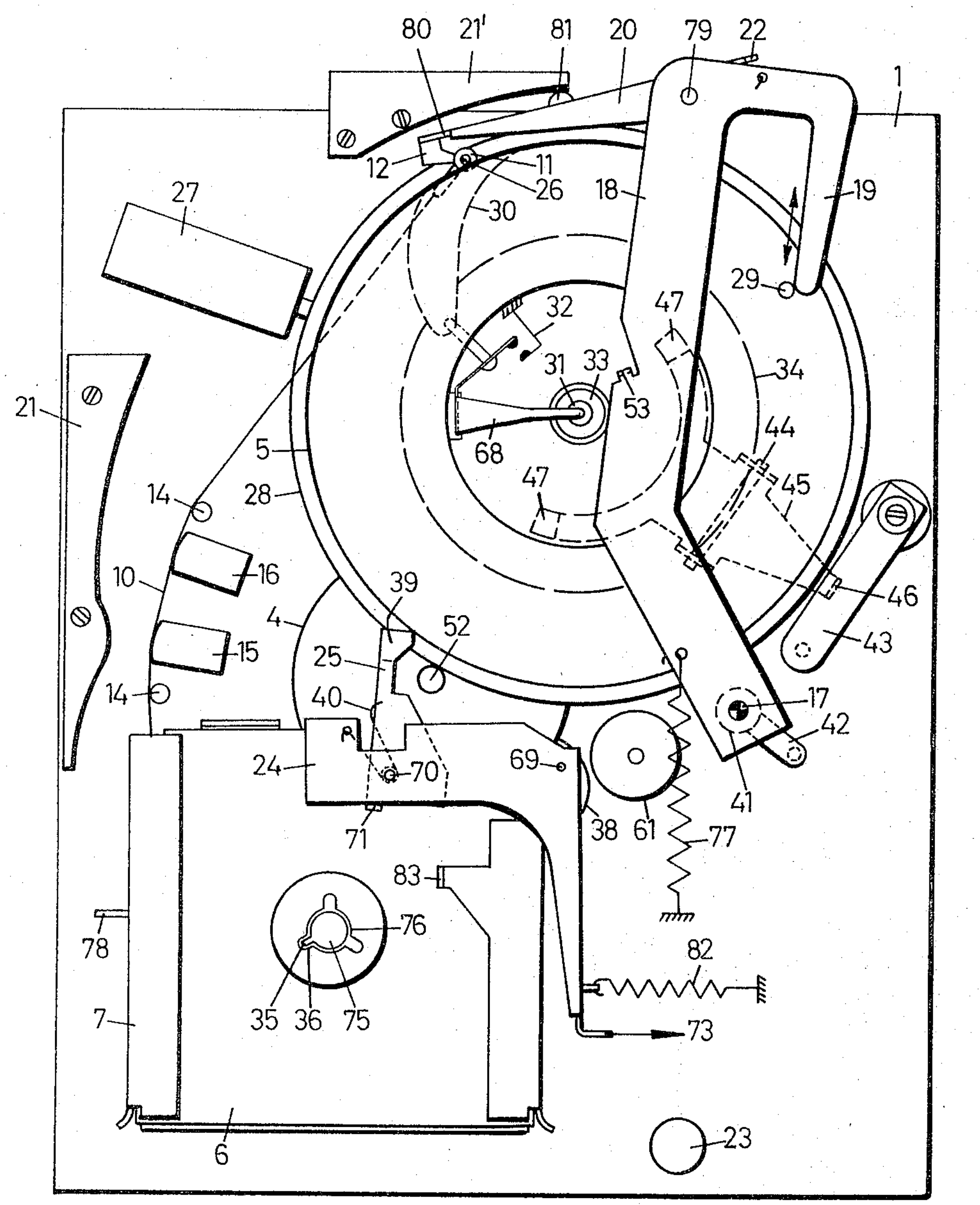
FIG. 3 shows the structure of FIGS. 1 and 2 at the moment when the leading end of the tape is about to move in toward the core of the reel to become attached to the latter.

The structure of the invention includes a substantially L-shaped lever 24 turnable about a pin 69 and carrying at its left end, as viewed in FIGS. 1–3, a downwardly directed lug 84 located in the path of movement of the rear edge of the cassette 6, so that when the latter is introduced into the frame 7, the rear edge of the cassette 6 will engage the lug 84 of the lever 24 to turn the latter from the position of FIG. 1 into the position of FIG. 2.

Figure 4:
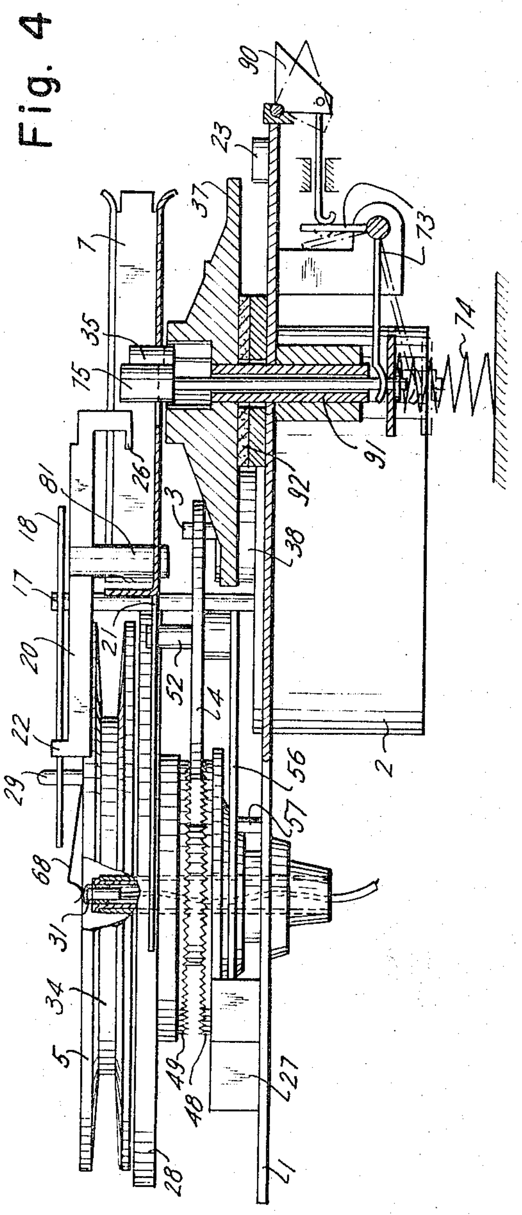
FIG. 4 is a partly diagrammatic longitudinal elevation illustrating how the driving motor transmits its drive to various parts and how some of the structure is controlled.
Figure 5:
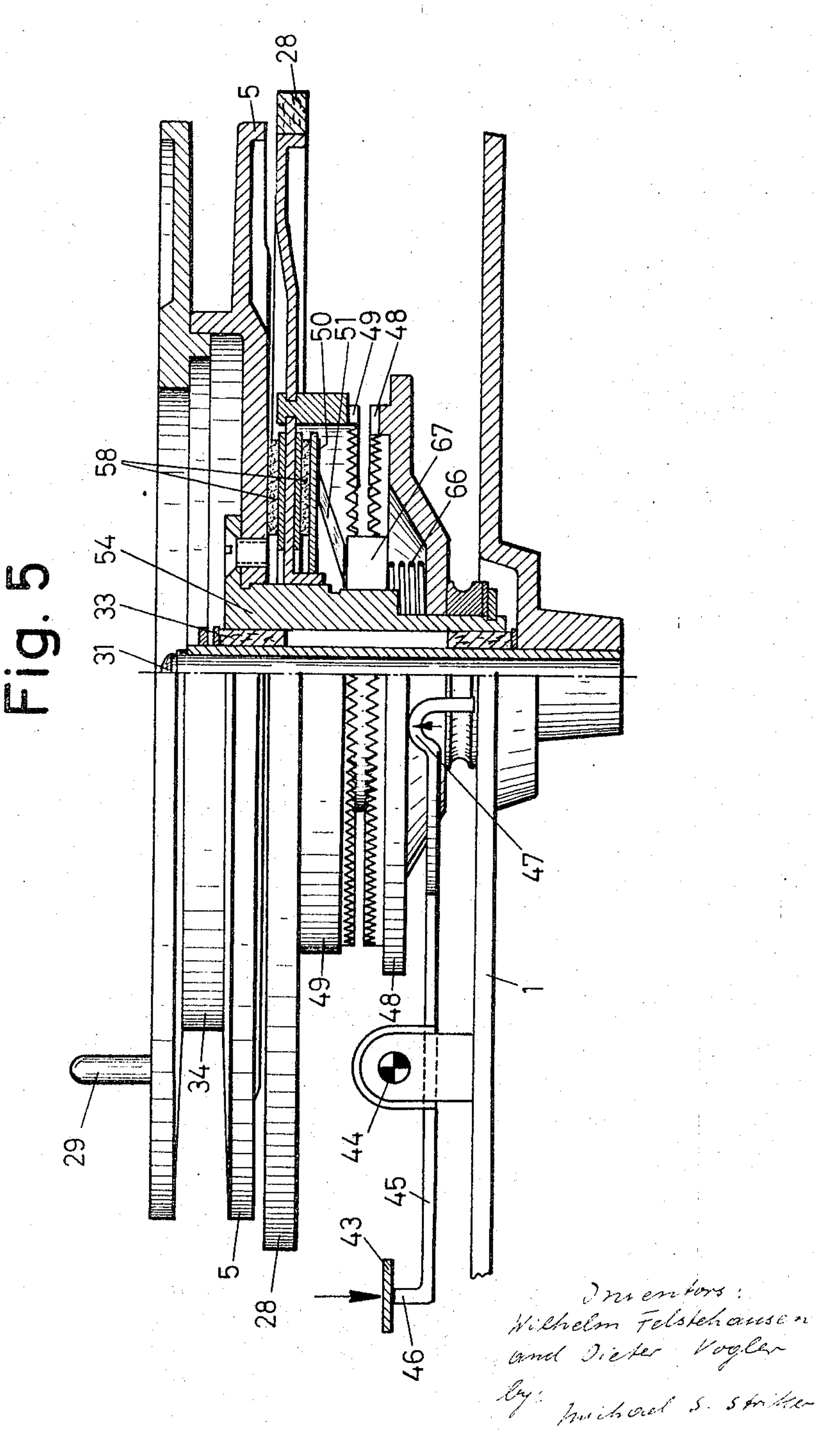
FIG. 5 is a partly sectional elevation of the rotary reel means and the structure for controlling the latter.

It is to be noted from FIG. 4 that the wall 1 carries at its front end a manually turnable element 90 which is turned by the operator from the solid to the dot-dash line position shown in FIG. 4 and held in this position during the introduction of the cassette 6 into the frame 7. As may be seen from FIG. 4, an element 75 to which a fin 35 is fixed extends into the interior of the frame 7 and would therefore be located in the path of movement of the cassette 6 if this element 75 were not lowered. The depression of the element 90 by the operator will cause the lever 73 shown in FIG. 4 to turn in a counterclockwise direction from the solid to the dot-dash line position, compressing the spring 74 and lowering the shaft which is connected to the element 75 and which is slidable in the sleeve 91 shown in FIG. 4, so that in this way the element 75 together with the fin 35 are lowered relative to the frame 7 to clear the interior thereof so that the cassette 6 can be moved all the way into the frame 7. Once the cassette 6 has moved past the element 75 the operator can release the element 90 and the spring 74 will urge the member 75 back up to its position shown in FIG. 4, and it will be seen from FIGS. 2 and 3 that the inner core 9 to which the tape 8 is connected is formed with an opening 76 for receiving the element 75. In addition this opening 76 communicates with three cutouts which extend radially from the opening 76, and as soon as one of these cutouts is aligned with the fin 35 this fin will move into one of the radial cutouts 36 while the element 75 will move into the central opening 76, and in this way the core 9 is connected through the elements 35, 75 with a rotary member 37 (FIG. 4) which comes into play during rewinding of the tape into the cassette in a manner described below.

The lever 24 turnably carries, at a pivot pin 70, a lever 25, and a spring 40 is coiled about the pin 70, has one end connected to the lever 24 as by passing through an opening thereof, and has an opposite end extending around the left edge of the lever 25, as viewed in FIGS. 1–3, so that the spring 40 continuously urges the lever 25 to turn in a clockwise direction relative to the lever 24, as viewed in FIGS. 1–3. The lever 25 carries at one end a lug 71 which, by engagement with an edge of the lever 24, limits the clockwise turning of the lever 25 by the spring 40, and the lever 25 is shown in this position where the lug 71 prevents further turning of the lever 25 by the spring 40 in FIGS. 1 and 3. At its free end which is distant from the lever 24, the lever 25 is provided with a downwardly inclined springy portion 39 which extends beneath and engages the lever 18 when this lever 18 is in its rest position shown in FIG. 1. As the lever 24 is turned by the cassette 6 from the position of FIG. 1 into the position of FIG. 2 the lever 25 will turn with the lever 24 and an edge 72 of the lever 25 will engage a lug 53 of the lever 18 with the result that the lever 18 will be turned in a clockwise direction about the pivot pin 17 from the position of FIG. 1 into the position of FIG. 2 by the time the cassette 6 has been introduced all the way into the frame 7, and since the element 75 snaps up into the recess 76 of the core 9, the cassette 6 cannot move away from the frame 7 and the lever 24 will be maintained by the cassette in the position shown in FIG. 2 where the lever 25 maintains the lever 18 in the starting position of this lever which is shown in FIG. 2 and to which the lever 18 has been displaced from the rest position thereof shown in FIG. 1.

The rotary reel means 5 carries a motion transmitting means for transmitting the motion of the rotary reel means 5 to the lever 18, and this motion transmitting means takes the form of a pin 29 fixed to and extending upwardly from the reel 5, so that the pin 29 rotates together with the reel 5. It will be noted that the displacement of the lever 18 from the rest position of FIG. 1 into the starting position of FIG. 2 has located the elongated portion 19 of the lever 18 in the path of turning of the pin 29, this pin 29 turning together with the reel 5 in a clockwise direction, as viewed in FIGS. 1–3, in response to the drive transmitted to the reel 5 from the motor 2 in the manner described above.

It is to be noted that in the rest position of the lever 18 shown in FIG. 1, the catch portion 12 of the lever 20 engages a stop member 78 fixed to and extending laterally from the frame 7. The turning of the lever 18 from the rest position of FIG. 1 to the starting position of FIG. 2 has resulted in movement of the lever 20 rearwardly along the left side of the frame 7, as viewed in FIGS. 1 and 2, and, as is shown in FIG. 2, this left side is slotted to the rear of the stop member 78 so that the catch member 12 passes through this slot, the projection 81 cooperating with the guide 21 to turn the lever 20 in a counterclockwise direction relative to the lever 18 which turns in a clockwise direction so that the catch 12 passes through the slot in the left wall of the guide 7 into the latter, and in this way the pointed tip 26 of the catch member 12 enters into the opening of the fitting 11 and is situated in this opening when the lever 18 has reached the starting position thereof shown in FIG. 2.

Thus, when the turning pin 29 engages the element 19, and the instant of engagement of the elements 29 and 19 is shown in FIG. 2, this element 29 will displace the lever 18 further about the pivot 17 from the position of FIG. 2 to the position of FIG. 3, and it will be noted that at this time the pin 29 will first move toward the free end of the lever 18 which is most distant from the pivot 17 and will then move back toward the tip of the guide element 19. A spring 77 (FIG. 3) constantly urges the lever 18 back toward its rest position, and thus when the pin 29 rides off the tip of the element 19 (FIG. 3) the spring 77 will swing the lever 18 back toward the position thereof shown in FIG. 1. It is to be noted that when the tip 26 of the catch member 12 is in the opening of the fitting 11 at the starting position of the lever 18 shown in FIG. 2, the projection 81 engages a bulging portion of the guide 21 which serves to move the catch 12 into the guide 7 so as to place the tip 26 in alignment with the opening of the fitting 11. However, when the fitting 11 is advanced toward the reel 5 by movement of the lever 20 with the lever 18 toward the position of FIG. 3, the projection 81 moves beyond the bulging portion of the guide 21 and the entire lever 20 is displaced in a clockwise direction by the spring 13 to displace the catch 12 and the fitting 11 to the left, as viewed in FIGS. 2 and 3, beyond the range of the elements 14–16, as described above, and in this way the element 11 cannot engage the elements 14–16.

As was pointed out above, it is the introduction of the cassette 6 all the way into the frame 7 that results in the transmission of motion from the motor 2 to the reel 5. This is brought about by closing of the switch 55. As is apparent from FIGS. 1 and 2, the rear wall of the cassette 6 will engage the switch 55 and will close the latter only when the cassette 6 is all the way in the frame 7. As may be seen from FIG. 6, the closing of the switch 55 energizes the electromagnet 27, the circuit being completed through the contact 592. As may be seen from FIG. 1, the energizing of the electromagnet 27 will cause the armature thereof to swing the lever 56 about a stationary pivot 57 in a counterclockwise direction, as viewed in FIG. 1, and the end of the lever 56 distant from the electromagnet 27 is formed with an opening through which the drive member 52 freely passes, and this drive member 52 together with the friction wheel 4 to which it is coaxially fixed are guided for movement with the lever 56 to and from the position shown in FIG. 1. In the position of FIG. 1 the periphery of the wheel 4 engages the motor shaft 3 while the periphery of the element 52 engages the friction wheel 28, so that the closing of the switch 55 energizes the electromagnet 27 and places the transmission 4, 52 in its operative position driving the reel 5 through the friction clutch 58 at the normal speed. Thus, while the actuation of the button 23 starts the operation of the motor 2, the reel 5 does not start to turn until the switch 55 has been closed by the cassette 6, and initially the reel 5 is driven at the normal speed of rotation. Thus, the pin 29 will displace the lever 18 from the position of FIG. 2 into the position of FIG. 3 while the reel 5 rotates at its normal speed of rotation. When the electromagnet 27 is unenergized, an unillustrated spring acts on the armature thereof to turn the lever 56 in a clockwise direction, as viewed in FIG. 1, displacing elements 52 and 4 away from the elements 28 and 3, respectively.

As is apparent from FIGS. 1–3, the lever 18 has a tubular hub portion 41 which receives the pivot pin 17, and this hub portion 41 carries a projection 42 which extends beneath a leaf spring 43. As long as the projection 42 is beneath the leaf spring 43 this leaf spring is displaced upwardly with respect to the free end 46 of the lever 45 so that the spring assembly 66, 51 maintains the ring 48 in its disengaged position shown in FIG. 5. However, the turning of the lever 18 beyond the position shown in FIG. 2 in a clockwise direction, as viewed in FIG. 2, displaces the element 42 away from the leaf spring 43, so that the latter due to its own resiliency presses down on the free end 46 of the lever 45 turning the latter in a counterclockwise direction about the pivot 44, as viewed in FIG. 5, and providing the direct drive to the reel 5 in the manner described above, so that at this time the slip clutch 58 is rendered inoperative and the parts will be reliably driven to displace the lever 18 to the position shown in FIG. 3. It is to be noted that the free end of the element 42 is inclined downwardly so that when the lever 18 swings back from the position of FIG. 3 this element 42 can engage beneath the spring 43 and raise the latter so that the spring assembly 51, 66 will then return the ring 48 to its disengaged position shown in FIG. 5, thus rendering the slip clutch 58 again operative.

It will be noted that when the lever 18 has been displaced by the pin 29 to the region indicated in FIG. 3 the guide 21′ cooperates with the projection 81 of lever 20 for placing the latter in a position where the fitting 11 together with the catch member 12 have started to move into the space between the flanges of the reel 5. The inner faces of these flanges are respectively formed with a pair of aligned grooves 30 having the configuration shown in FIG. 3, and of course the cooperation of the pin 29 with the lever 18 will provide a predetermined angular relationship between the reel 5 and the fitting 11, and this relationship is such that when the parts have the position shown in FIG. 3 the fitting 11 is aligned with the free open ends of the grooves 30, and of course the free ends of the fitting 11 which extend laterally beyond the leader portion 10 will enter into the grooves 30 while the leader 10 and the remainder of the tape will simply be situated between the flanges. Thus, at the instant when the pin 29 rides off the tip of the element 19 the spring 77 (FIG. 3) will swing the lever 18 back toward its rest position with the result that the catch member 12 will move to the left, as viewed in FIG. 3, away from the fitting 11 and the latter will remain momentarily in the outer end portions of the grooves 30, but the continued turning of the reel 5 and the configuration of the grooves 30 is such that these grooves 30 will cooperate with the free ends of the fitting 11 to advance the latter toward the core 34 of the reel 5 during the continued turning thereof in the maner described above, and thus the fitting 11 will approach an operating element connected to a part of a switch 32 (FIG. 3) for closing the switch 32 when the fitting 11 reaches the innermost ends of the grooves 30 at the core 34. The electrical connection to the switch 32 is made through an electrically conductive member 68 which is permanently carried by the reel 5 and which has a free end engaging an elongated electrically conductive member 31 shown in FIG. 5 housed in a suitable sleeve which is in turn located within the bearing members 33 which are pressed into the tubular hub 54 of the reel 5. In this way when the fitting 11 becomes situated at the core 34 the switch 32 will be closed.

As the lever 18 is swung back toward its rest position by the spring 77, the lug 22 of course limits the turning of the lever 20 relative to the lever 18 by the spring 13, in the manner described above, and the upper right corner of the guide 21 is situated in such a way that it will clear the lever 20 which can now move along the guide 21 while the lever 18 turns toward its rest position. When the edge 72 of the lever 25 engaged the lug 53 of the lever 18 during displacing of the latter from the position of FIG. 1 into the position of FIG. 2, this lug 53 acted on the lever 25 to turn the latter in opposition to the spring 40 through a slight angle where the lug 71 did not engage the lever 24 and where the lever 25 was displaced in a counterclockwise direction about the pivot 70 from the position of the lever 25 which is illustrated in FIG. 3. As soon as the pin 29 engages the element 19 to displace the lever 18 in a clockwise direction from the position of FIG. 2 toward the position of FIG. 3, the lug 53 moved away from the lever 25 releasing the latter to the spring 40 which then turn the lever 25 from the position of FIG. 2 into the position of FIG. 3. As a result, when the lever 18 returns toward its rest position the lug 53 does not engage the edge 72 and instead rides up the inclined free end portion 39 of the lever 25 along the upper surface of the lever 25 at the part thereof which is located to the left of the edge 72, and now the lug 53 can continue to move along the top surface of the lever 25 into the notch at the rear edge of the lever 24 shown just to the right of the lug 84 which is engaged by the cassette 6, so that the spring 77 returns the lever 18 back to its rest position where the catch member 12 engages the stop member 78, and thus during the continued turning of the reel 5 the pin 29 will not again engage the element 19 of the lever 18.

It is to be noted that when the cassette 6 is removed from the machine the lever 24 will be returned by the spring 82 shown in FIG. 3 to the position of the lever 24 which is shown in FIG. 1, and the turning of the lever 24 at this time is limited by engagement of the lever 24 with a lug 83 formed from part of the frame 7. Thus, with the lever 18 in the position shown in FIG. 1 the lever 24 will be returned to the position shown in FIG. 1 when the cassette is removed, and at this time the lever 25 will slide with respect to the lever 18 until the lever 25 reaches the position indicated in FIG. 1. It will be noted that the turning of the lever 24 about the pivot 69 displaces the lever 25 to the left away from the lug 53, and in addition the inclined free end portion 39 only extends partly beneath the lever 18 in the position shown in FIG. 1, so that when the next cassette is introduced and the lever 24 is turned in a clockwise direction the edge of the lever 25 adjoining the edge 72 thereof will be at the elevation of the lug 53 to engage the latter and cause the lug 53 again to engage the edge 72 in the manner described above. Thus, in this way when the lever 24 has the position in FIGS. 2 and 3 the lever 25 will be turned by the spring 40 to the position of FIG. 3 providing for the lug 53 a surface along which the lug can slide while the lever 18 returns to the position of FIG. 1 from that of FIG. 3, while when the lever 25 has the position shown in FIG. 1 and is turned to the position of FIG. 2 the edge 72 of the lever 25 which engages the lug 53 for displacing the lever 18 from the position of FIG. 1 into the position of FIG. 2.

Figure 6:
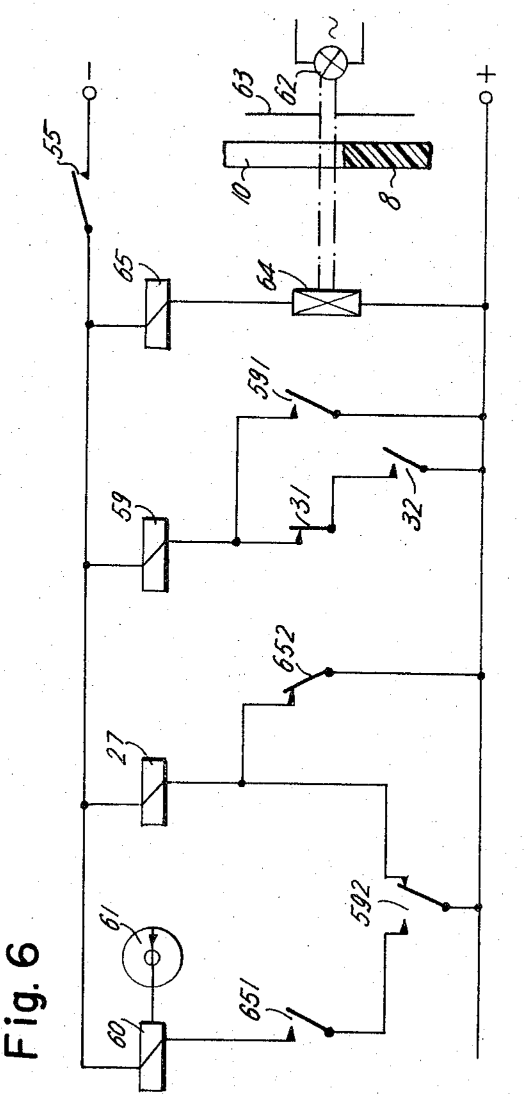
FIG. 6 is a wiring diagram of part of the electrical control structure of the invention.

Referring to FIG. 6, it will be seen that the closing of the switch 32 by the fitting 11 in the manner described above, causes the electromagnet or relay 59 to become energized, and as a result the normally open switch 591 of FIG. 6 will become closed so that the holding relay circuit for the relay 59 is closed, and at the same time the switch 592 which normally assumes the position shown in FIG. 6 is moved by the energized relay 59 to the position where it is located in the circuit of the electromagnet 60, and thus the electromagnet 60 has its circuit ready to be closed as soon as the switch 651 closes, so that the electromagnet 60 will be energized. The switches 651 and 652 of FIG. 6 are controlled by a relay 65 which is actuated in a manner described below, and at the moment when the relay 59 becomes energized by closing of the switch 32 the relay 65 will act to open the switch 652 and close the switch 651, so that the electromagnet 27 will become unenergized while the electromagnet 60 will become energized and thus the friction wheel 61 will be displaced into engagement with the friction wheel 28 and the friction wheel 38 which turns with the drive shaft as pointed out above. As is apparent particularly from FIG. 1, the drive from the friction wheel 38 through the friction wheel 61 to the friction wheel 28 will provide for the reel 5 turning at a much faster speed than when the electromagnet 27 was energized, so that in this way the drive means will be adjusted to provide for the reel 5 rotation at a faster speed than the normal speed, and this will cause the elongated leader portion 10 to be wound onto the reel 5 at a faster speed.

An optical sensing means is provided for sensing the movement of the leader portion 10 to the reel 5, and this optical sensing means is shown diagrammatically in FIG. 6. Thus, this sensing means includes a lamp 62 which projects a beam of light through an opening of an opaque plate 63 to a photosensitive resistor 64. The leader portion 10 moves across the beam of light which travels toward the resistor 64, and the same is true of the remainder of the tape 8. In accordance with the present invention the leader portion 10 is made of a transparent plastic material while the remainder of the tape 8 is of course opaque and carries the magnetizable particles. The photosensitive resistor 64 is such that when the light from the lamp 62 reaches the resistor 64 it will have a relatively low resistance so that the relay 65 will be energized as long as the light from the lamp 62 reaches the resistor 64. Thus, while the transparent leader 10 moves toward the reel 5 the energized relay 65 will maintain the switch 652 open and the switch 651 closed. As was pointed out above the circuit through the electromagnet 27 was closed through the switch 592. However, as soon as the switch 32 is closed by the fitting 11 the switch 592 closes the circuit of the electromagnet 60, and the switch 651 has already been closed while the switch 652 is of course open, so that the drive is switched over from normal to fast operation as described above. When the junction of the leader portion 10 and the remainder of the tape 8 reaches the light beam, the opaque tape 8 will prevent the light from the lamp 62 from reaching the resistor 64 which now sharply increases its resistance thus rendering the relay 65 inoperative so that the switch 651 opens and the switch 652 closes. At this time the switch 592 will not move back to the position of FIG. 6 because the relay 59 remains energized, so that the electromagnet 27 is energized at this time through the switch 652, while of course the electromagnet 60 has become deenergized due to the opening of the switch 651. An unillustrated spring now acts on the armature of the electromagnet 60 for displacing the wheel 61 away from the wheels 28 and 38, and of course the energizing of the magnet 27 turns the transmission 4, 52 into the position shown in FIG. 1 so that the reel 5 will now again be driven at the normal speed. Of course, since the lever 18 has already returned to its rest position the element 42 has raised the spring 43 so that the transmission to the reel now takes place through the slip clutch. While other controls, such as suitable switches, can be used instead of the above-described optical sensing means, this optical sensing means is preferred because of its simplicity and reliability. Once the parts have reached this position where the normal speed of drive is set into operation, the recorder is operated in a conventional manner and can be stopped and started at any time in a manner well known in the art.

As was indicated above, the operator depresses the member 90 (FIG. 4) in order to displace element 75 downwardly to permit the cassette 6 to be introduced, and when the element 90 is released the element 75 is returned by the spring 74 to a position within the core 9 with the fin 35 located in a notch 36. As is apparent from FIG. 1, the entire frame 7 can be turned about the pivot pin 85, and there is available to the operator a switch button 86 which can be depressed for energizing the electromagnet 87 which will now pull on its armature 88 which is connected at 89 to the frame 7 so that the frame can now swing through a slight distance in a counterclockwise direction about the pivot 85. The wall 1 is formed with a slot through which the sleeve 91 of FIG. 4 passes so that the element 75 together with the friction wheel 37 can turn together with the frame 7. It will be noted that the friction wheel 37 rests on a layer 92 of a material similar to the slip clutch material of the clutch 58, so that the wheel 37 can slip with respect to the layer 92. Moreover, the fin 35 is located in a notch of the wheel 37 which communicates with the bore which receives the element 75. When the operator depresses the button 86, therefore, the turning of the frame 7 will displace the friction wheel 37 into engagement with the friction wheel 38 which is fixed to the drive shaft 3, as described above, and now the drive from the motor will be transmitted through the wheel 37 to the element 35 and from the latter to the core 9 for rotating the latter to rewind the tape onto the cassette. When the rewinding of the tape onto the cassette has been completed the fitting 11 will of course again be located in the position indicated in FIG. 2, and the operator will release the switch 86 which automatically opens to deenergize the electromagnet 87, and an unillustrated spring returns the frame through the slight angular distance required to place it in the position indicated in FIGS. 1–3, so that rewinding drive stops. Of course, during rewinding the operator has previously stopped the operation of the recorder, so that the recorder was not recording or playing back when the switch 86 was actuated, and of course when the operation of the recorder is stopped by the operator the reel 5 is not driven.

Once the fitting 11 reaches the position shown in FIG. 2, the operator can depress element 90 so as to lower elements 35 and 75, and now the spring 82 will return the lever 24 to the position of FIG. 1, and this turning of the lever 24 by the spring 82 will partially eject the cassette from the frame 7, and the operator can manually engage the cassette to remove it from the frame. Of course the result is that the switch 55 opens thus deenergizing the relay 59 so that the parts again return to the position indicated in FIG. 6.

Since the normal drive to the reel 5 is through the slip clutch 58, the reel 5 will slip with respect to the drive provided by the energized electromagnet 27 since the rewinding is done by a direct drive through the elements 37 and 38. During normal use of the apparatus the reel will be maintained stationary even though the drive continues to the slip clutch, when the operator is not recording or playing back, the control at this time being provided through the unillustrated pressure rolls which engage the tape to control the movement thereof with respect to the recording, erasing, and play-back heads.

Of course, when the operator releases element 90 the spring 74 of FIG. 4 will again raise element 75 to the illustrated position.

It will be understood that each of the elements described above, or two or more together, may also find a useful application in other types of recorders differing from the types described above.

While the invention has been illustrated and described as embodied in tape attaching apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a sound recorder or other tape-handling apparatus, in combination, a tape having a leader portion of properties different from those of the remainder of the tape and having a free end; rotary reel means; adjustable drive means for driving the reel means at a normal speed in one position of the adjustable drive means and at a faster speed in another position of the adjustable drive means; automatic means for automatically connecting said leader portion to said rotary reel means when the tape is mounted on the recorder; automatic sensing means sensing when a predetermined part of said leader portion of the tape has been wound onto said reel means; and means controlled by said automatic sensing means and cooperating with said adjustable drive means for automatically placing said drive means in said position driving said reel means at said faster speed until said part of said leader portion has been wound thereon, and for placing said drive means in said normal speed position thereof for then driving and reel means at said normal speed after said part of said leader portion has been wound on said reel means.

2. In an apparatus as recited in claim 1, said part of said leader portion being approximately equal to the entire length thereof so that said drive means is changed from said faster to said normal speed to approximately the time when the leader portion has been completely wound onto said reel means.

3. In an apparatus as recited in claim 1, means rendering said sensing means operative only approximately when the free end of said leader portion reaches said reel means and said drive means driving said reel means at said normal speed until said sensing means is rendered operative.

4. In a sound recorder or other apparatus adapted to treat a tape, in combination, a tape having a leader portion of properties substantially different from the properties of the remainder of the tape; support means for supporting the tape on the apparatus; rotary reel means; adjustable drive means operatively connected to said rotary reel means for driving the latter at a normal speed in one adjusted position of said drive means and at a fast speed in another adjusted position of said drive means; means actuated by said tape when the latter is mounted on said support means for automatically starting said drive means at said normal speed thereof; means automatically connecting said leader portion to said reel means after the tape is mounted on said support means; sensing means sensing the movement of said leader portion to said reel means and means controlled by said sening means and cooperating with said drive means for automatically placing said drive means in said position driving said reel means at said fast speed during movement of said leader portion to said reel means and for automatically returning said drive means to the position where it drives said reel means at said normal speed when said sensing means sense the approach of the junction between the leader portion and the remainder of the tape of said reel means.

5. In an apparatus as recited in claim 4, said support means including a frame for receiving the tape and said means which is actuated by the tape to start said drive means being actuated by said tape only when the latter has been fully mounted on said frame.

6. In a sound recorder or other tape-handling apparatus, in combination, an opaque tape and an elongated transparent leader portion connected thereto; rotary reel means; adjustable drive means for driving the reel means at a normal speed in one position of such adjustable drive means and at a faster speed in another position of the adjustable drive means; automatic means for automatically connecting said leader portion to said reel means when the tape is mounted on the apparatus; optical means past which said transparent leader portion moves during winding of the latter onto said reel means; and means controlled by said optical means and cooperating with said adjustable drive means for maintaining said drive means in said faster speed position thereof as long as said transparent leader portion moves past said optical means and placing said drive means in said normal speed position thereof when said opaque tape arrives at said optical means.

7. In an apparatus as recited in claim 6, said optical means including a lamp, a photosensitive resistor receiving light from said lamp, said light passing through said transparent leader portion when the latter moves from said optical means, the opaque tape interrupting the travel of light from the lamp to the resistor when the tape reaches said optical means.

8. In a sound recorder or other tape-handling apparatus, in combination, support means for supporting a tape; rotary reel means; means adapted to engage said rotary reel means to be moved thereby for automatically attaching the leading end of the tape to said reel means; drive means for driving said reel means, said drive means including a slip clutch and direct drive means; and means rendering said direct drive means operative and said slip clutch inoperative until said tape is attached to said reel means and rendering said direct drive means inoperative and said slip clutch operative when said tape is attached to said reel means so that said drive means drives said reel directly before said tape is attached to said reel means and through said slip clutch after said tape is attached to said reel means.

9. In a sound recorder or other tape-handling apparatus, in combination, a tape having a leader portion of properties substantially different from those of the remainder of the tape, said leader portion having a free end; support means for supporting said tape on said apparatus; rotary reel means; adjustable drive means operatively connected to said rotary reel means for driving the latter at a normal speed in one adjusted position and at a fast speed at another adjusted position; means actuated by said tape when the latter is mounted on said support means for automatically starting said drive means at normal speed; means adapted to engage said rotary reel means to be driven thereby for automatically connecting said free end of said leader portion to said reel means; first sensing means for sensing the connection of said free end of said leader portion of said tape to said reel means; second sensing means for sensing the approach of the junction between said leader portion and the remainder of said tape to said reel means; and means controlled by said first and second sensing means and cooperating with said adjustable drive means for placing the latter into said other adjusted position when said first sensing means senses attachment of said free end to said reel means and in said one adjusted position when said second sensing means senses the approach of said junction to said reel means.

References Cited by the Examiner

UNITED STATES PATENTS

| | | | |
|---|---|---|---|
| 2,891,736 | 6/1959 | Blaes | 242—55.12 |
| 2,952,416 | 9/1960 | Sampson | 242—55.12 |
| 2,964,593 | 12/1960 | Kleve | 242—55.12 X |
| 3,090,574 | 5/1963 | Doncaster et al. | 242—55.13 |
| 3,104,843 | 9/1963 | Missriegler et al. | 242—55.13 |

FOREIGN PATENTS

| | | |
|---|---|---|
| 833,549 | 4/1960 | Great Britain. |

FRANK J. COHEN, *Primary Examiner.*

GEORGE F. MAUTZ, *Examiner.*